United States Patent
Rychen

(10) Patent No.: US 8,296,857 B2
(45) Date of Patent: Oct. 23, 2012

(54) SCANNING PROBE MICROSCOPE WITH CURRENT CONTROLLED ACTUATOR

(75) Inventor: Jörg Rychen, Zürich (CH)

(73) Assignee: Specs Zürich GmbH, Zurich (CH)

( * ) Notice: Subject to any disclaimer, the term of this patent is extended or adjusted under 35 U.S.C. 154(b) by 0 days.

(21) Appl. No.: 13/132,012

(22) PCT Filed: Dec. 17, 2008

(86) PCT No.: PCT/CH2008/000538
§ 371 (c)(1), (2), (4) Date: Aug. 18, 2011

(87) PCT Pub. No.: WO2010/069085
PCT Pub. Date: Jun. 24, 2010

(65) Prior Publication Data
US 2011/0296564 A1    Dec. 1, 2011

(51) Int. Cl.
G01Q 10/00 (2010.01)
G01Q 10/06 (2010.01)

(52) U.S. Cl. .............. 850/5; 850/1; 850/21; 850/23; 850/37; 850/51

(58) Field of Classification Search .......... 850/1, 5, 850/21, 23, 37, 51
See application file for complete search history.

(56) References Cited

U.S. PATENT DOCUMENTS

| | | | | |
|---|---|---|---|---|
| 5,267,471 A | * | 12/1993 | Abraham et al. | 73/105 |
| 5,574,278 A | * | 11/1996 | Poirier | 850/33 |
| 5,714,831 A | * | 2/1998 | Walker et al. | 310/316.01 |
| 5,865,978 A | * | 2/1999 | Cohen | 205/118 |
| 6,075,585 A | | 6/2000 | Minne et al. | |
| 6,823,724 B1 | * | 11/2004 | Kobayashi et al. | 73/105 |
| 7,387,016 B2 | * | 6/2008 | Nakamoto | 73/105 |
| 7,690,047 B2 | * | 3/2010 | Yasuda et al. | 850/54 |
| 7,770,231 B2 | * | 8/2010 | Prater et al. | 850/6 |
| 7,891,015 B2 | * | 2/2011 | Russell | 850/4 |
| 7,975,314 B2 | * | 7/2011 | Ando | 850/4 |
| 2006/0186758 A1 | * | 8/2006 | Yuasa et al. | 310/317 |
| 2006/0213260 A1 | * | 9/2006 | Nakamoto | 73/105 |

(Continued)

FOREIGN PATENT DOCUMENTS

JP    2003102182 A    4/2003

(Continued)

OTHER PUBLICATIONS

Jersch et al., "Interface circuits for quartz crystal sensors in scanning probe microscopy applications," *Rev. Sci. Instrum.*, 77:083701-1-5 (2006).

*Primary Examiner* — David A Vanore
(74) *Attorney, Agent, or Firm* — Marshall, Gerstein & Borun LLP

(57) ABSTRACT

The piezo-electric actuator (1) to oscillate the probe of a scanning probe microscope is arranged in the feedback branch (3) of an analog amplifier (4). A current source (10) is provided for feeding a defined alternating current to the input of the amplifier (4). The amplifier (4) strives to adjust the voltage over the actuator (1) such that the current from the current source (10) flows through the actuator (1). As the current through the actuator (1) is proportional to its deflection, this design allows to run the actuator at constant amplitude without the need of complex feedback loops.

12 Claims, 2 Drawing Sheets

U.S. PATENT DOCUMENTS

| | | |
|---|---|---|
| 2006/0261264 A1 | 11/2006 | Warren et al. |
| 2009/0307809 A1* | 12/2009 | Ziegler et al. ............... 850/62 |
| 2010/0031404 A1* | 2/2010 | Rychen ........................ 850/33 |
| 2010/0071098 A1* | 3/2010 | Mirkin et al. ................ 850/21 |
| 2010/0218286 A1* | 8/2010 | Lai et al. ...................... 850/6 |
| 2011/0030109 A1* | 2/2011 | Saito ............................. 850/5 |
| 2011/0271412 A1* | 11/2011 | Rychen ........................ 850/21 |
| 2011/0289635 A1* | 11/2011 | Burns et al. .................. 850/1 |
| 2011/0296564 A1* | 12/2011 | Rychen ........................ 850/37 |
| 2012/0079630 A1* | 3/2012 | Ginger et al. ................ 850/1 |

FOREIGN PATENT DOCUMENTS

| | | |
|---|---|---|
| WO | WO-2008/148224 A1 | 12/2008 |
| WO | WO-2010/022521 A1 | 3/2010 |

* cited by examiner

SCANNING PROBE MICROSCOPE WITH CURRENT CONTROLLED ACTUATOR

TECHNICAL FIELD

The invention relates to a scanning probe microscope with a probe oscillated by a piezoelectric actuator.

BACKGROUND ART

Examples of scanning probe microscopes are described in WO 2008/071013 and WO 2008/006229. They have a probe forming a tip to be moved along a sample. The probe is continuously oscillated by means of an oscillating voltage applied over a piezoelectric actuator.

A typical design for driving the piezoelectric actuator Q in a conventional device is shown in FIG. 1. As can be seen, an oscillating voltage is applied over the actuator Q and the current flowing through the actuator Q is amplified by means of an amplifier A. The output of amplifier A is a measure for the mechanical amplitude of the oscillation of the actuator. In order to keep this mechanical amplitude constant, a feedback loop is required that strives to keep the amplitude of the output of amplifier A constant by appropriately controlling the oscillator. Since the piezoelectric actuators are driven in a resonance and a high quality factor of this resonance is of special interest to enhance the sensitivity to frequency shifts, the control of the amplitude is quite demanding with respect to the dynamic range of the amplitude of the excitation signal and with respect to the controller design.

DISCLOSURE OF THE INVENTION

Hence, it is a general object of the invention to provide a scanning probe microscope that makes controlling the amplitude of the actuator oscillation easy.

This object is achieved by the scanning probe microscope of claim 1. Accordingly, an inverting amplifier is provided and the actuator is driven by a current flowing through a feedback branch between the amplifier output and the inverting amplifier input. In addition, a current source feeds an oscillating current to the inverting amplifier input.

In such a circuit, the amplifier strives to keep the current through the feedback branch equal to the current from the current source. Since the amplitude of the current through the actuator is, for an oscillating current, directly proportional to the mechanical amplitude of the motion of the actuator (when neglecting the current through the stray capacitance parallel to the piezoelectric element), the mechanical amplitude can thus be directly controlled by the current source. As long as the current from the current source has constant amplitude, the mechanical amplitude of the actuator is conas well. No further means for controlling the mechanical amplitude is required.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 2:
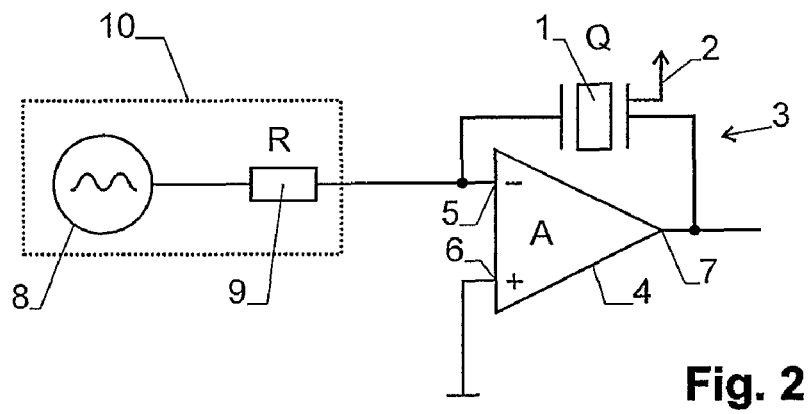
FIG. 2 shows a basic circuit for operating the actuator in the feedback branch.

The device of FIG. 2 comprises a probe having a piezoelectric actuator 1 and a probe tip 2. Piezoelectric actuator 1 serves to oscillate the probe and in particular its probe tip 2 as known to the skilled person. It is arranged in the feedback branch 3 of an inverting amplifier 4. Amplifier 4 is an analogue amplifier. It is designed as an operational amplifier and has an inverting amplifier input 5, a noninverting amplifier input 6 an amplifier output 7.

Noninverting amplifier input 6 is connected to a constant reference potential, such as ground. Feedback branch 3 is located between amplifier output 7 and said inverting amplifier input 5.

A current source 10 is formed by an oscillator 8 generating an oscillating voltage and a high impedance resistor 9 of e.g. 10 MΩ, i.e. the impedance of resistor 9 is much smaller than the input impedance of amplifier 4 but larger then the impedance of the piezo element at the resonance.

The amplitude of the voltage from oscillator 8 is constant or at least known. Therefore, the current from current source 10 also has constant or at least known amplitude.

Amplifier 4 strives to control the voltage over feedback loop 3 in such a manner that the current through feedback loop 3 is exactly equal to the current from current source 10.

The charge on actuator 1 is proportional to its mechanical deflection or deformation. Therefore, for a periodic oscillation of actuator 1, the mechanical amplitude of the motion of actuator 1 is proportional to the amplitude of the current flowing through actuator 1. Hence, in the circuit of FIG. 2, the amplitude of the current from current source 10 is proportional to the mechanical amplitude of actuator 1.

Therefore, in the circuit of FIG. 2, a given amplitude of the current from current source 10 leads to a defined mechanical oscillation amplitude. No further means for controlling the mechanical oscillation amplitude are required.

Figure 3:
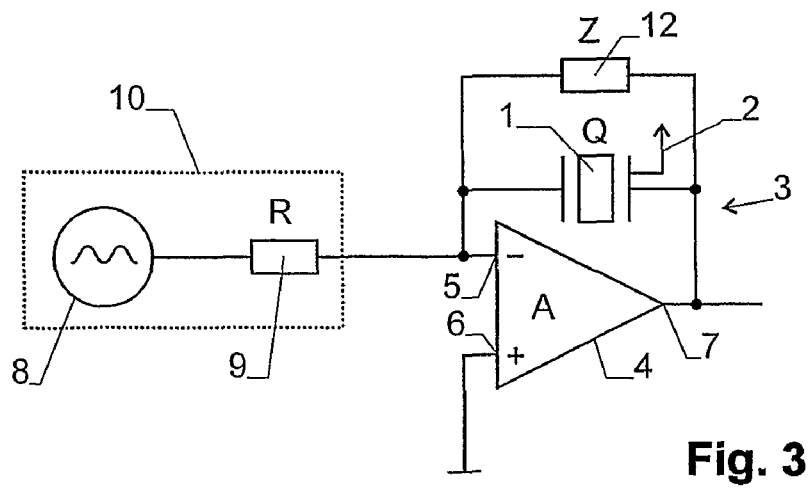
FIG. 3 shows an alternative with parallel impedance.

Feedback loop 3 can comprise further components in addition to actuator 1. In the embodiment of FIG. 3, feedback branch 3 comprises a first impedance 12 arranged parallel to actuator 1. Such an impedance can be used to control the properties of the feedback branch.

Advantageously, impedance 12 is chosen such that it draws only a comparatively small current when actuator 3 is oscillating in resonance, i.e. the current through actuator 3 should be much larger than the current through impedance 12. Therefore, if the impedance value Z of impedance 12 is written as $$Z = R + 1/(j \cdot \omega \cdot C)$$

with R being the resistance of impedance Z, $1/(j \cdot \omega \cdot C)$ being its capacitive reactance and ω being the resonance frequency, the resistance and/or reactance should be much smaller than the resistance and/or reactance of actuator 1.

For typical actuators, this is fulfilled if the resistance R is at least 1 MΩ because a typical resistance of actuator 1 at resonance is 10-100 kΩ. On the other hand, the resistance should not be too large in order to properly define a DC operating point of amplifier 4, e.g. resistance R should be smaller than 1 GΩ. Hence, advantageously, resistance R should be between 1 MO and 1 GΩ. An advantageous value of resistance R has been found to be approximately 10 MΩ.

On the other hand, the capacitive reactance $1/(j\cdot\omega\cdot C)$ should not be larger than $1/(j\cdot\omega\cdot 100\text{ pF})$. But it should not be too large, e.g. smaller than $1/(j\cdot\omega\cdot 1\text{ pF})$ because otherwise the amplifier output tends to become unstable. An advantageous value of the reactance has been found to be $1/(j\cdot\omega\cdot 5\text{ pF})$.

Figure 4:
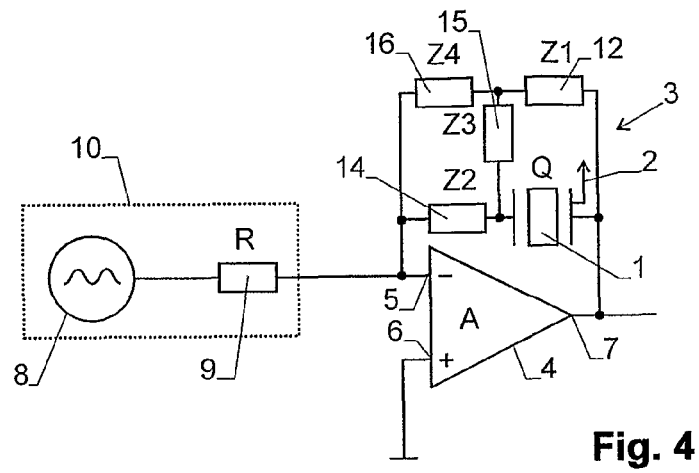
FIG. 4 shows a more complex design of the feedback branch.

The design of the feedback loop can be more complex such as shown in the embodiment of FIG. 4. Here, a second impedance 14 is arranged in series to actuator 3 and further impedances 15, 16 are provided for forming a filter with any desired properties.

Advantageously, the second impedance 14, i.e. the impedance in series to actuator 1, should have a resistance much smaller than the resistance of actuator 1 at resonance, i.e. it should typically be smaller than 1 kΩ.

Figure 5:
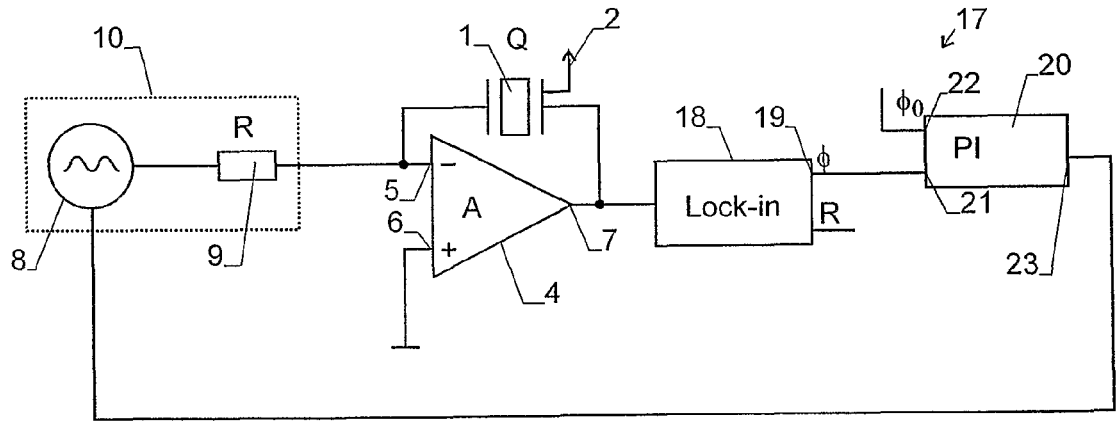
FIG. 5 shows a complete control loop for operating the probe at resonance.

FIG. 5 shows a scanning probe microscope having a loop 17 for controlling the frequency of current source 10 as a function of the voltage present at amplifier output 7. Loop 17 comprises a lock-in amplifier 18, which has a phase output 19 carrying a signal indicative of the phase φ of the voltage at amplifier output 7 in respect to reference signal generated by the oscillator 8. Phase output 19 is fed to the signal input 21 of a loop controller 20, namely a PI- or PID-controller. Loop controller 20 has a reference input 22 carrying a signal indicative of a desired phase shift $\phi_0$ and strives to control the voltage at its output 23 such that phase φ equals desired phase shift $\phi_0$. Output 23 of loop controller 20 controls the frequency of oscillator 8 of current source 10.

To operate the device of FIG. 5, the desired phase shift $\phi_0$ is set to the phase shift when actuator 1 operates in resonance. Then, loop 17 will keep actuator 3 oscillating in resonance.

Figure 6:
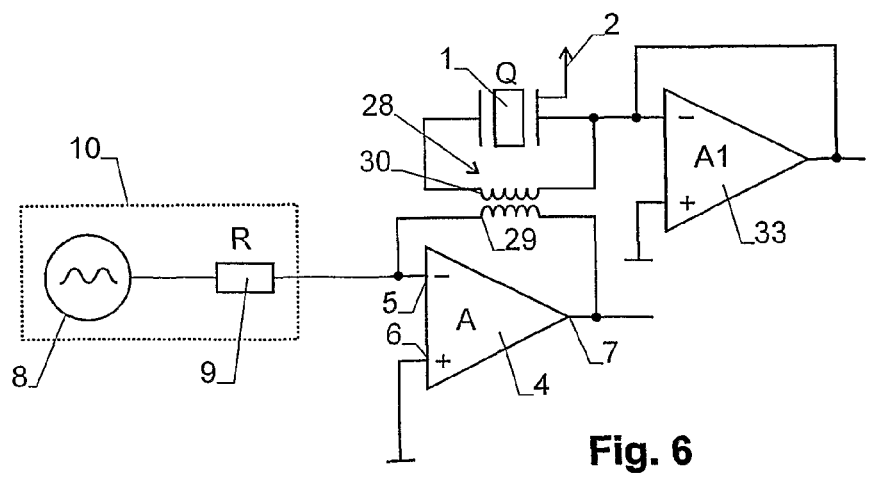
FIG. 6 shows yet another alternative design of the feedback branch.

FIG. 6 shows yet a further class of designs for feedback loop 3. Here, feedback loop 3 comprises an transformer 28 with a primary winding 29 and a secondary winding 30. Actuator 1 is arranged in series with secondary winding 30. The feedback current is running through n primary winding 29, inducing a corresponding current in secondary loop 30 and therefore in actuator 1 for actuating the same.

The advantage of the design of FIG. 6 lies in the fact that a tunnel current running through probe tip 2 and into/from the sample being investigated can be measured separately from the excitatory current of actuator 1, even if probe tip 2 is electrically connected to one of the electrodes of actuator 1. For this purpose, one electrode of actuator 1 can e.g. be connected to an amplifier 33, which selectively measures the tunneling current.

Figure 1:
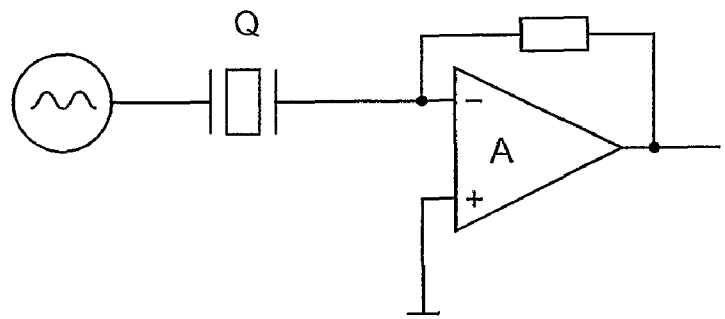
FIG. 1 shows a prior art design.

It must be noted that the design of FIG. 6 can also be applied in the prior art design of FIG. 1.

In the embodiments above, current source 10 consisted of a voltage source and resistor 9 in series. Other types of current sources, as known to the skilled person, can be used as well.

While there are shown and described presently preferred embodiments of the invention, it is to be distinctly understood that the invention is not limited thereto but may be otherwise variously embodied and practiced within the scope of the following claims.

The invention claimed is:

1. A scanning probe microscope comprising
 a probe,
 a piezoelectric actuator for oscillating the probe,
 an inverting amplifier having an inverting amplifier input, an amplifier output and a feedback branch between said amplifier output and said inverting amplifier input, wherein the piezoelectric actuator is driven by a feedback current through said feedback branch, and
 a current source for feeding an oscillating input current to said inverting amplifier input.

2. The scanning probe microscope of claim 1 further comprising a first impedance being arranged in said feedback branch parallel to said actuator.

3. The scanning probe microscope of claim 2 wherein said first impedance has a resistance between 1 MΩ and 1 GΩ.

4. The scanning probe microscope of claim 2 wherein said first impedance has a reactance between $1/(j\cdot\omega\cdot 100\text{ pF})$ and $1/(j\cdot\omega\cdot 1\text{ pF})$, with ω being a resonance frequency of said probe.

5. The scanning probe microscope of claim 1 further comprising a second impedance being arranged in said feedback branch in series to said actuator.

6. The scanning probe microscope of claim 5 wherein said second impedance has a resistance smaller than 1 kΩ.

7. The scanning probe microscope of claim 1 further comprising a transformer having a primary winding and a secondary winding, wherein said feedback current is running through said primary winding and wherein said actuator is in series to said secondary winding.

8. The scanning probe microscope of claim 1 wherein said amplifier is an operational amplifier having a noninverting amplifier input in addition to said inverting amplifier input, wherein said noninverting amplifier input is connected to a reference potential.

9. The scanning probe microscope of claim 1 wherein said amplifier is an analog amplifier.

10. The scanning probe microscope of any of the preceding claims further comprising a loop controlling a frequency of said current source as a function of a voltage present at said amplifier output.

11. The scanning probe microscope of claim 10 wherein said loop comprises
 a lock-in amplifier connected to said amplifier output and a phase output indicative of a phase of a voltage at said amplifier output, and
 a loop controller controlling a frequency of said current source in order to keep said phase constant.

12. The scanning probe microscope of claim 11 wherein said loop controller is a PI- or PID-controller.

* * * * *